United States Patent [19]

Yoshimura

[11] Patent Number: 4,650,212

[45] Date of Patent: Mar. 17, 1987

[54] VEHICLE SUSPENSION SYSTEM

[75] Inventor: Takashi Yoshimura, Hiroshima, Japan

[73] Assignee: Mazda Motor Corporation, Japan

[21] Appl. No.: 839,214

[22] Filed: Mar. 13, 1986

[30] Foreign Application Priority Data

Mar. 20, 1985 [JP] Japan .................................. 60-56379
Mar. 20, 1985 [JP] Japan .................................. 60-56380

[51] Int. Cl.$^4$ ............................................. B60G 17/00
[52] U.S. Cl. ..................................... 280/707; 280/714
[58] Field of Search ................ 280/702, 703, 707, 714

[56] References Cited

U.S. PATENT DOCUMENTS

| | | | |
|---|---|---|---|
| 2,247,749 | 7/1941 | DeVenel | 280/707 |
| 3,321,210 | 5/1967 | Delchev | 280/707 |
| 3,603,612 | 9/1971 | Hill et al. | 280/707 |
| 3,608,925 | 9/1971 | Murphy | 280/707 |
| 3,827,538 | 8/1974 | Morgan | 188/319 |
| 4,555,126 | 11/1985 | Ishimitsu et al. | 280/707 |
| 4,568,101 | 2/1986 | Bleustein et al. | 280/707 |
| 4,589,675 | 5/1986 | Braun et al. | 280/707 |
| 4,591,185 | 5/1986 | Natsume et al. | 280/707 |

Primary Examiner—Richard A. Bertsch
Attorney, Agent, or Firm—Gerald J. Ferguson, Jr.; Michael P. Hoffman; Ronni S. Malamud

[57] ABSTRACT

A vehicle is provided with a suspension system comprising front and rear suspension systems the suspension characteristics of which are separately variable. The suspension characteristics of the front and rear suspension systems are controlled so that, when the vehicle speed is lower than a predetermined value, the steering characteristic is more toward the oversteer side during rolling of the vehicle than during straight travel of the vehicle and, when the vehicle speed is not lower than the predetermined value, the steering characteristic is fixed irrespective of whether the vehicle rolls.

13 Claims, 6 Drawing Figures

VEHICLE SUSPENSION SYSTEM

BACKGROUND OF THE INVENTION

1. Field of the Invention

This invention relates to a vehicle suspension system, and more particularly to a vehicle suspension system in which the suspension characteristics of the front and rear suspension systems are made variable to enable control the steering characteristic of the vehicle.

2. Description of the Prior Art

There has been known a vehicle suspension system which has variable damping rate shock absorbers and the suspension characteristic of which can be varied by changing the damping rates of the shock absorbers. See U.S. Pat. No. 3,827,538, for instance.

In our U.S. Pat. No. 4,555,126 (granted Nov. 26, 1985), we have proposed a vehicle suspension system in which the damping rates of the shock absorbers are separately controlled to change the suspension characteristics of the front and rear suspension systems to change the steering characteristic of the vehicle according to the running condition of the vehicle. For example, when the vehicle is traveling straight forward at a speed higher than a predetermined value, e.g., 80 km/h, the damping rate of the shock absorbers of the front suspension system is increased to set the suspension characteristic of the front suspension system to a "hard" mode and the damping rate of the shock absorbers of the rear suspension system is reduced to set the suspension characteristic of the rear suspension system to a "soft" mode, thereby holding the understeer characteristic of the vehicle. When the vehicle then begins to roll, upon taking a curve, for instance, the damping rate of the shock absorbers of the front and rear suspension systems are controlled to set the suspension characteristics of both the front and rear suspension systems to the "hard" mode, thereby enhancing the gripping force of the front and rear tires to keep the steering characteristic of the vehicle neutral. As is well known, an understeer tendency is preferred when the vehicle is running straight at a high speed in order to improve running stability, while a neutral-steer tendency is preferred when the vehicle is rolling in order to stabilize the running position during cornering.

However, if the suspension characteristics of both the front and rear suspension systems are set to the "hard" mode when the vehicle rolls at a very high speed, e.g., higher than 120 km/h, the neutral-steer tendency comes to act as the oversteer tendency as the vehicle speed increases so that even a slight external disturbance can have a great influence on the steering system, thus lowering the driving stability. From this point of view, the vehicle suspension system we proposed is disadvantageous.

SUMMARY OF THE INVENTION

In view of the foregoing observations and description, the primary object of the present invention is to provide a vehicle suspension system in which the running stability during straight traveling and rolling at a high speed can be improved and at the same time the driving stability during traveling at a very high speed can be improved.

In accordance with the present invention, the suspension characteristics of the front and rear suspension systems are controlled so that, when the vehicle speed is lower than a predetermined value, the steering characteristic is more toward the oversteer side during rolling of the vehicle (when the degree of rolling of the vehicle is larger than a predetermined value) than during straight travel of the vehicle (when the degree of rolling is smaller than the predetermined value) and, when the vehicle speed is not lower than the predetermined value, the steering characteristic is fixed irrespective of whether the vehicle rolls.

DESCRIPTION OF THE PREFERRED EMBODIMENTS

Figure 1:
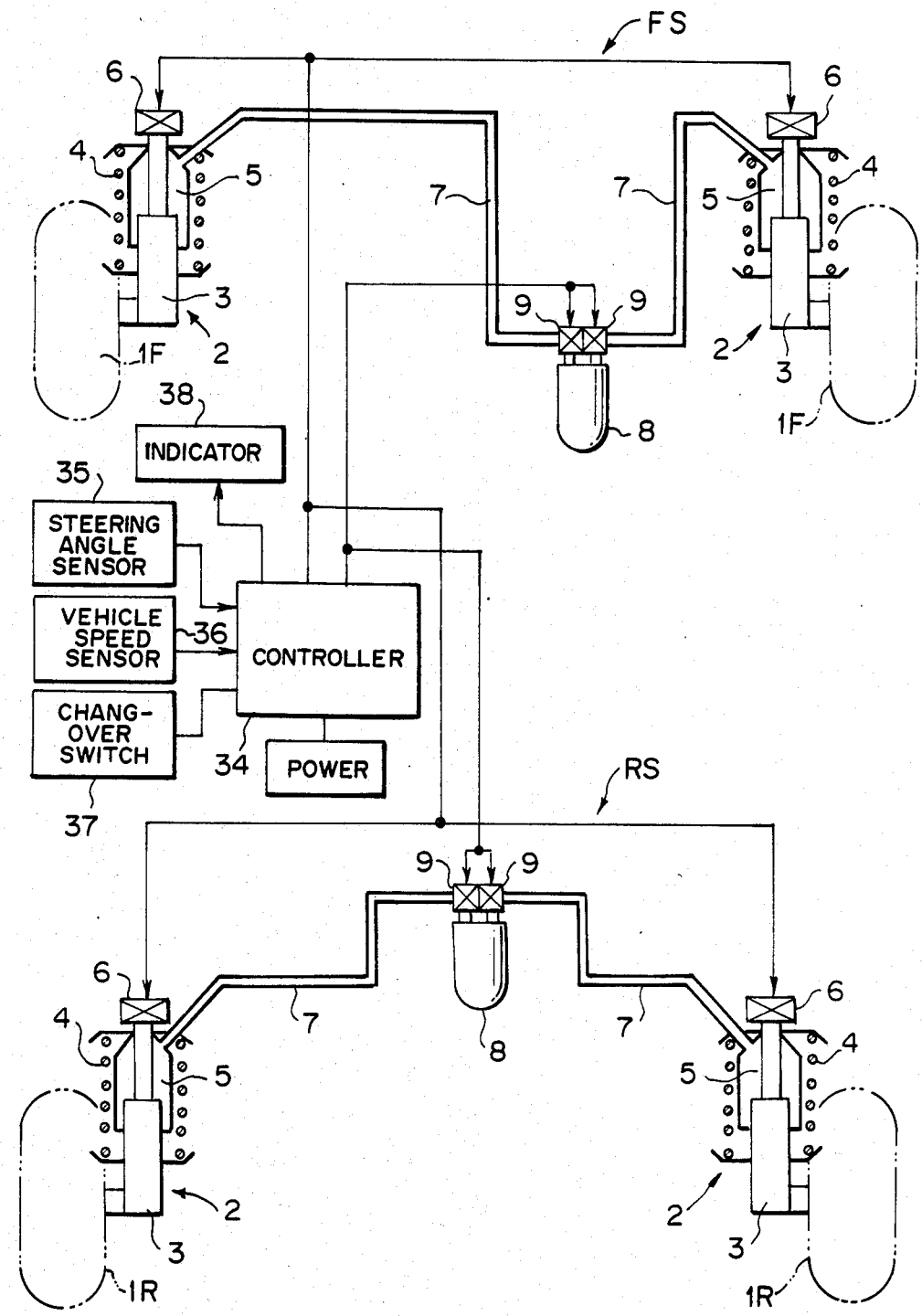
FIG. 1 is a schematic view of a suspension system in accordance with an embodiment of the present invention.
Figure 2:
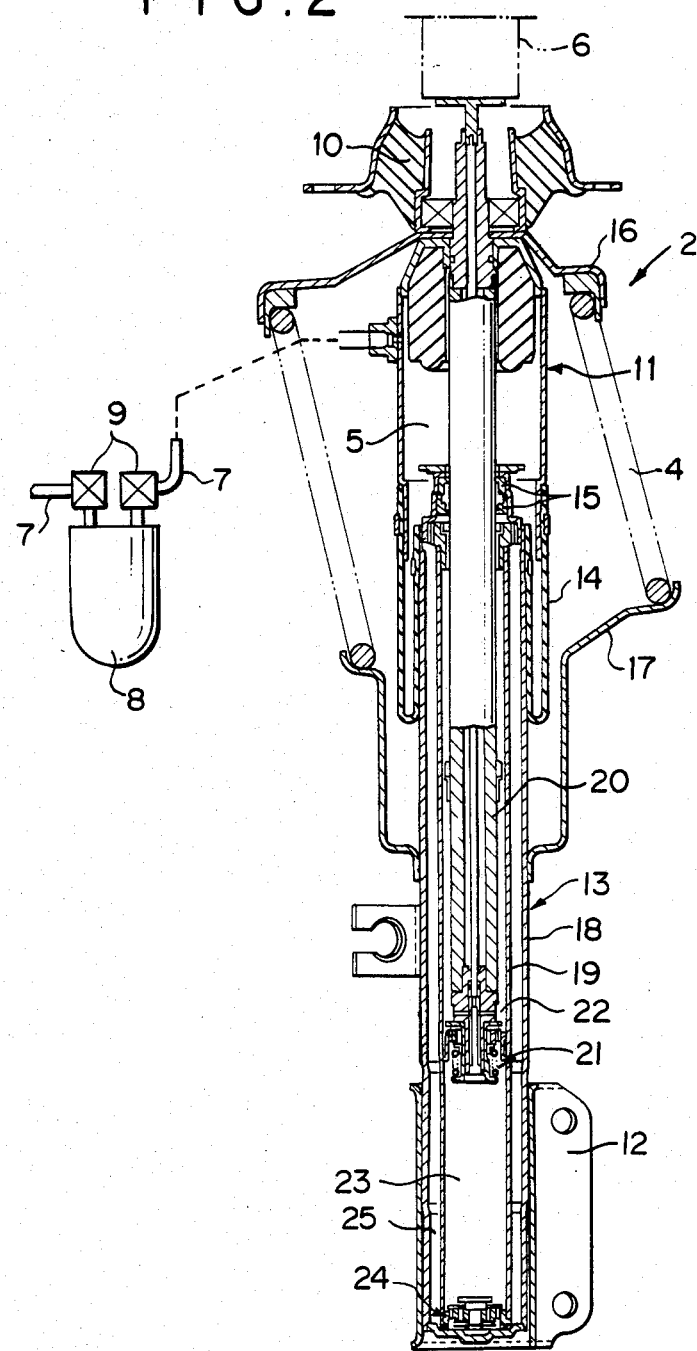
FIG. 2 is an enlarged cross-sectional view of the suspension assembly employed in the suspension system of FIG. 1.
Figure 3:
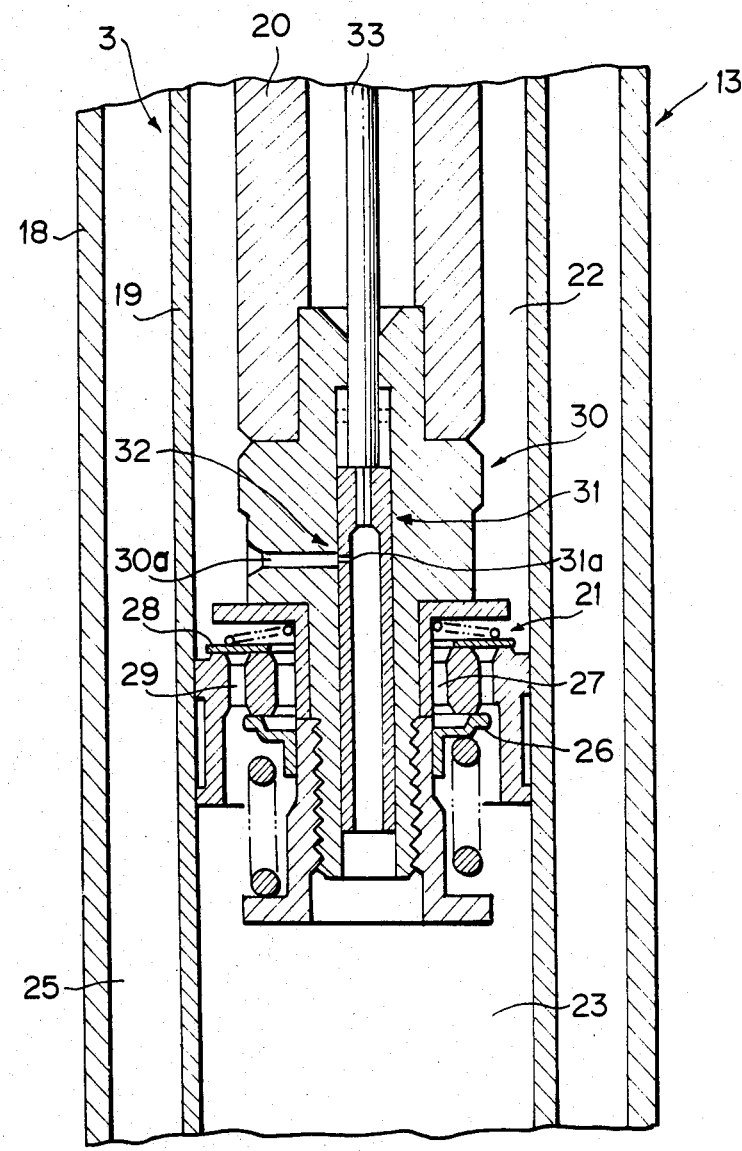
FIG. 3 is an enlarged cross-sectional view of the shock absorber of the suspension assembly shown in FIG. 2.

In FIG. 1, a vehicle suspension system in accordance with an embodiment of the present invention comprises front and rear suspension systems FS and RS for resiliently suspending front wheels 1F and rear wheels 1R. The front suspension system FS comprises a pair of suspension assemblies 2, each for suspending one of the front wheels 1F, and the rear suspension system RS comprises a pair of suspension assemblies 2, each for suspending one of the rear wheels 1R. Each suspension assembly 2 is of an air spring type and, as shown in FIGS. 2 and 3, comprises an upper casing 11 attached to the vehicle body by way of a resilient body 10, and a lower casing 13 which is movable up and down with respect to the upper casing 11 and is attached to the wheel (1F or 1R) by way of a bracket 12. The lower end of the upper casing 11 and the upper end of the lower casing 13 are connected by a rolling diaphragm 14. The interior of the upper casing 11 is separated from the interior of the lower casing 13 in an air-tight fashion by a seal member 15, whereby an air spring chamber 5 is formed in the upper casing 11. Spring retainer members 16 and 17 are respectively fixed to the upper and lower casings 11 and 13 and a coil spring 4 is retained between the spring retainers 16 and 17 around the upper casing 11. The air spring chamber 5 is connected to an accumulator 8 by way of a pipe 7. The pipe 7 is provided with a solenoid valve 9 for selectively opening and closing the pipe 7 to control the amount of air in the air spring chamber 5.

The lower casing 13 is formed by outer and inner tubular member 18 and 19. A piston rod 20 suspended from the upper casing 11 is inserted into the inner tubular member 19 for vertical sliding movement, and the interior of the inner tubular member 19 is parted into upper and lower hydraulic chambers 22 and 23 by a main valve 21 provided on the lower end of the piston rod 20. The inner tubular member 19 is provided with a bottom valve 24 at the lower end, and a reservoir chamber 25 is formed between the inner tubular member 19 and the outer tubular member 18.

As clearly shown in FIG. 3, the main valve 21 has an extension orifice 27 provided with a check valve 26 which permits flow of the working fluid from the upper hydraulic chamber 22 to the lower hydraulic chamber 23 but prevents flow of the working fluid in the reverse direction, and a retraction orifice 29 provided with a check valve 28 which permits flow of the working fluid from the lower hydraulic chamber 23 to the upper hydraulic chamber 22 but prevents flow of the working fluid in the reverse direction. Further, the main valve 21 is provided with an orifice valve 32 comprising a sleeve 30 which is communicated with the upper hydraulic chamber 22 by way of a communicating hole 30a and is directly communicated with the lower hydraulic chamber 23, and a valve body 31 which is received for rotation in the sleeve 30 and is provided with a communicating hole 31a adapted to be communicated with the communicating hole 30a of the sleeve 30. The valve body 31 of the orifice valve 32 is drivingly connected with a step motor 6 (FIG. 2) by way of a control rod 33 extending through the piston rod 20. A variable damping rate shock absorber 3 is thus formed by the upper and lower hydraulic chambers 22 and 23 and the main valve 21. That is, when the orifice valve 32 is moved by the step motor 6 to the position shown in FIG. 3 in which the communicating holes 30a and 31a are aligned with each other, the upper and lower hydraulic chambers 22 and 23 are communicated with each other by the communicating holes 30a and 31a in addition to communication by way of the orifices 27 and 29. In this state, the damping rate of the shock absorber 3 is reduced and the suspension characteristic of the suspension assembly 2 is set to the "soft" mode. On the other hand, when the communicating holes 30a and 31a are out of alignment, the upper and lower hydraulic chambers 22 and 23 are communicated with each other only by way of the orifices 27 and 29, and accordingly the damping rate of the shock absorber 3 is increased, whereby the suspension characteristic of the suspension assembly 2 is set to the "hard" mode.

Figure 4:
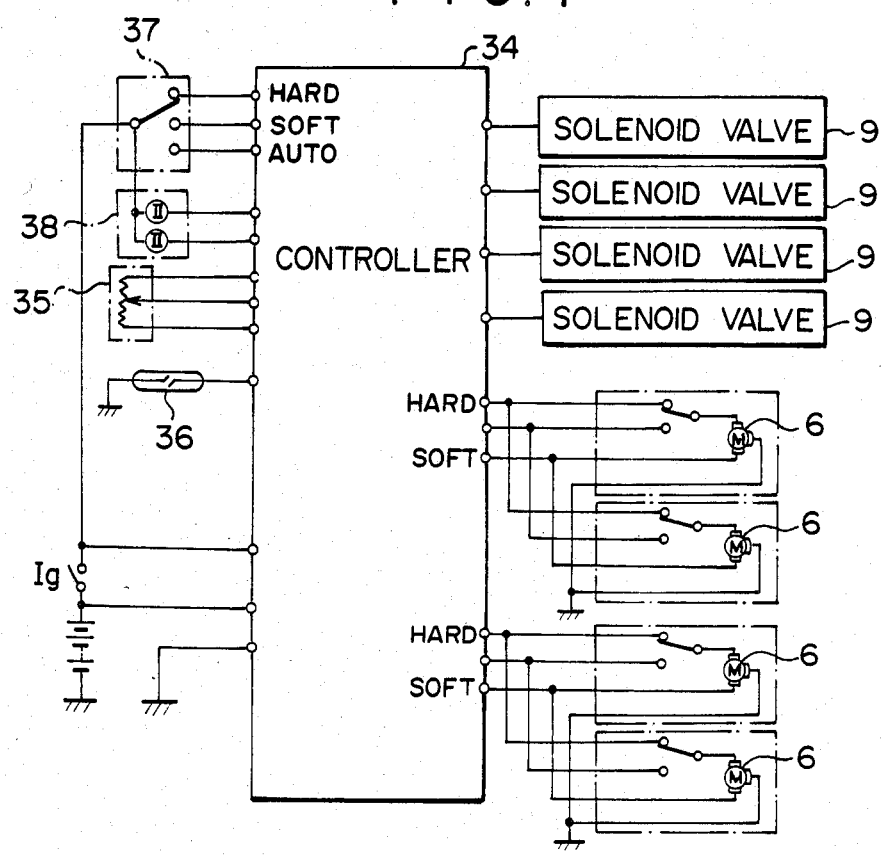
FIG. 4 is a circuit diagram showing the circuitry connected to the controller.
Figure 5:
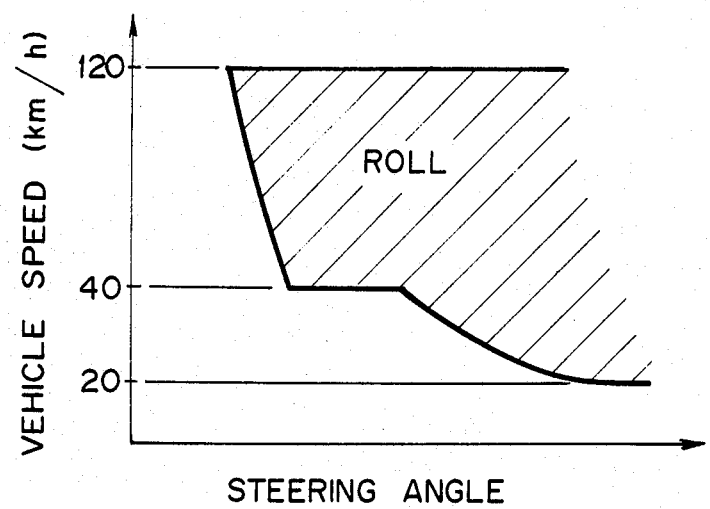
FIG. 5 is a view for illustrating a characteristic map for detecting rolling of the vehicle.

The step motors 6 and the solenoid valves 9 are controlled by a controller 34 having a built-in computer. As shown in FIG. 4, the controller 34 receives the output signals of a steering angle sensor 35 and a vehicle speed sensor 36. The steering angle sensor 35 detects the steering angle (the amount of change in the steering angle from a reference steering angle) by way of an analogue resistor. To the controller 34 is connected a changeover switch 37 for manually setting the suspension characteristics of the suspension assemblies 2 to the "soft" mode or the "hard" mode, and for setting the operational mode of the suspension system to an automatic mode in which the suspension characteristics of the suspension assemblies 2 are automatically controlled to the "soft" mode or the "hard" mode according to the operating condition of the vehicle as will be described in detail later. To the controller 34 is further connected an indicator 38 which indicates to which mode, hard or soft, the front and rear suspension systems FS and RS are set. The controller 34 applies the detected steering angle and the detected vehicle speed to a map such as shown in FIG. 5 and determines whether the vehicle is rolling.

When the automatic mode is selected by the changeover switch 37, the controller 34 separately controls the suspension characteristics of the front and rear suspension systems FS and RS according to the vehicle speed and whether or not the vehicle rolls in the manner shown in the table below. That is, when the vehicle speed is not lower than a first preset value (80 km/h in this particular embodiment) and lower than a second preset value (120 km/h in this particular embodiment) and when the vehicle runs straight forward, the suspension characteristic of the front suspension system FS is set to the "hard" mode and the same of the rear suspension system RS is set to the "soft" mode, thereby giving the vehicle an understeer tendency which improves running stability during straight travel at a high speed. The suspension characteristics of the front and rear suspension systems FS and RS can be separately controlled by controlling the step motor 6 and the solenoid valve 9 of each suspension assembly 2 as described above. When the vehicle speed is not lower than 80 km/h and lower than 120 km/h and at the same time the vehicle rolls, the suspension characteristics of both the front and rear suspension systems FS and RS are set to the "hard" mode, thereby enhancing the gripping force of the front and rear tires and stabilizing the attitude of the vehicle during rolling. When the vehicle runs at a very high speed not lower than 120 km/h, the suspension characteristic of the front suspension system FS is set to the "hard" mode and the same of the rear suspension system RS is set to the "soft" mode, irrespective of whether the vehicle rolls, thereby holding the understeer tendency and improving the running stability at a very high speed. When the vehicle is running straight at a speed lower than 80 km/h, the suspension characteristics of both the front and rear suspension systems FS and RS are set to the "soft" mode, thereby improving the driving comfort. When the vehicle rolls at a speed lower than 80 km/h, the suspension characteristics of both the front and rear suspension systems FS and RS are set to the "hard" mode, thereby enhancing the gripping force of the front and rear tires and stabilizing the attitude of the vehicle during rolling.

TABLE

| switch 37 | auto | | | | hard | soft |
|---|---|---|---|---|---|---|
| km/h | below 80 | | 80 to 120 | | over 120 | — | — |
| roll | yes | no | yes | no | — | — | — |
| FS | soft | hard | hard | hard | hard | hard | soft |
| RS | soft | hard | soft | hard | soft | hard | soft |

Though not essential, it is preferred that the suspension characteristic of the rear suspension systems RS be kept in the "hard" mode for a certain time interval after the end of each rolling of the vehicle. Otherwise, the suspension characteristic of the rear suspension system is frequently changed, i.e., hunting of the suspension characteristic occurs, if the steering wheel is continuously turned. It is further preferred that the time interval for which the suspension characteristic of the rear suspension system is kept to be the "hard" mode (This time interval will be referred to as the "holding time", hereinbelow.) be changed according to the vehicle speed, since the steering wheel is continuously turned more frequently at a low speed than at a high speed and accordingly if the holding time is determined to be long to prevent the hunting of the suspension characteristic of the rear suspension system during the low speed travel, driving comfort during the high speed travel is adversely affected.

Figure 6:
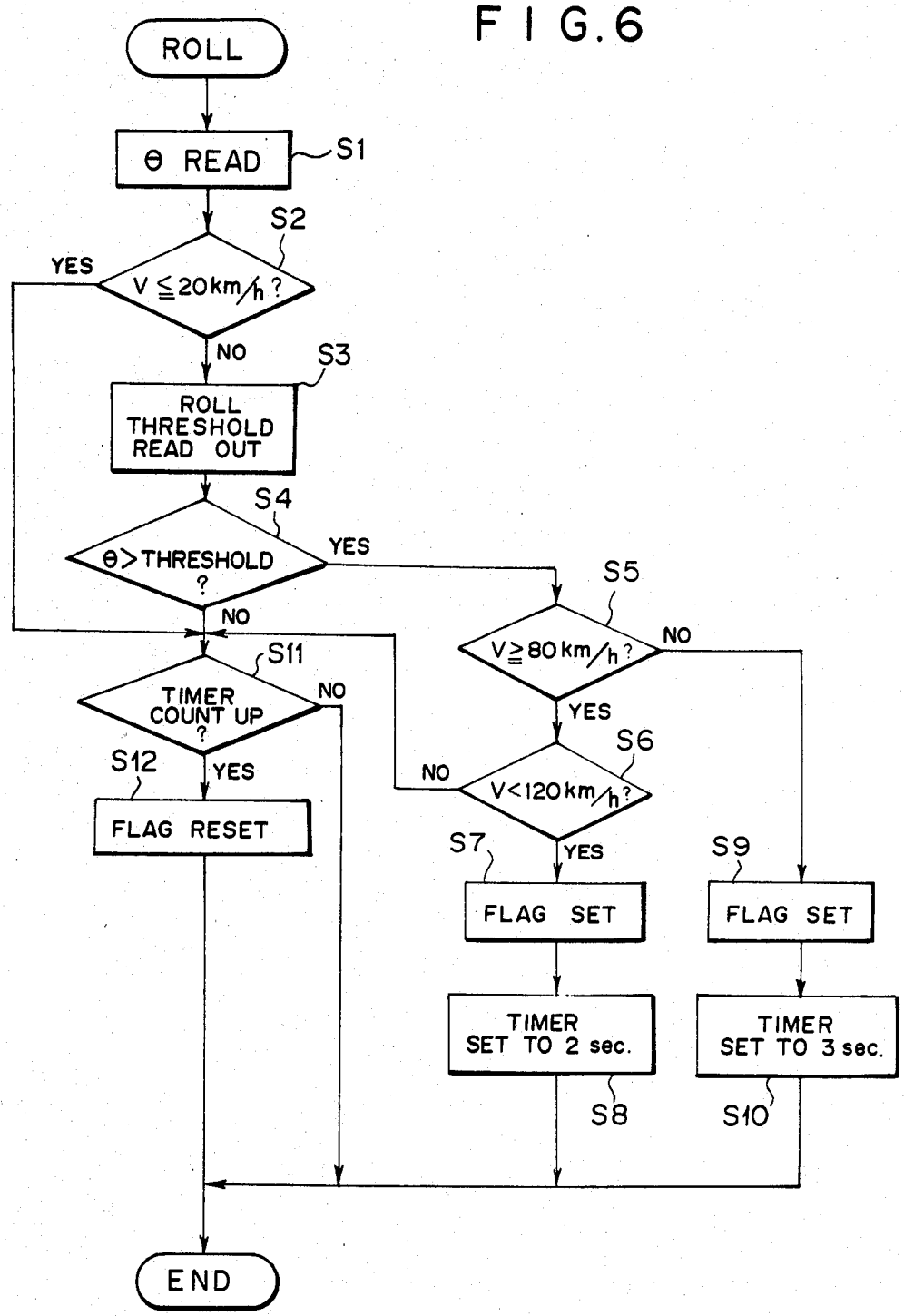
FIG. 6 is a flow chart for illustrating the operation of the controller in a suspension system in accordance with a modification of the embodiment shown in FIG. 1.

Now the operation of the controller 34 when the vehicle suspension system of the embodiment shown in FIG. 1 is modified so that the suspension characteristic of the rear suspension system is kept in the "hard" mode for three seconds after the end of each rolling of the vehicle during traveling at a speed lower than 80 km/h and for two seconds during traveling at a speed not lower than 80 km/h will be described with reference to FIG. 6 which shows a flow chart of the subroutine to be accomplished when it is determined that the vehicle rolls.

In step S1, the steering angle $\theta$ is read and in step S2, it is determined whether the vehicle runs at a very low speed not higher than 20 km/h. When it is determined that the vehicle speed v is higher than 20 km/h in the step S2, the controller 34 proceeds to step S3 and the threshold value of the steering angle corresponding to the vehicle speed v is read out from the map shown in FIG. 5. In step S4, it is determined whether the steering angle $\theta$ read in the step S1 is larger than the threshold value read out in the step S3. When it is determined that the former is larger than the latter, it determined whether the vehicle speed v is not lower than 80 km/h in step S5. When it is determined that the former is not lower than the latter, it is determined whether the vehicle speed v is higher than 120 km/h in step S6. If yes, a roll flag which indicates the rolling history of the vehicle is set in step S7. Then, a hard signal is delivered to the step motor 6 and the solenoid valve 9 of each suspension assembly 2 to set the suspension characteristics of both the front and rear suspension systems FS and RS to the "hard" mode, and a holding timer which determines the holding time is set to 2 seconds in step S8.

On the other hand, when it is determined that the vehicle speed is lower than 80 km/h in the step S5, the controller 34 proceeds to step S9 and sets the roll flag. Then, in step S10, the holding timer is set to 3 seconds.

When it is determined that the vehicle speed v is not higher than 20 km/h in the step S2, when it is determined that the steering angle $\theta$ is not larger than the threshold value in the step S4, or when it is determined that the vehicle speed v is not lower than 120 km/h in the step S6, the controller 34 proceeds to step S11. In the step S11, it is determined whether the holding timer set in the step S8 or S10 has expired. When it is determined that the holding timer has expired, the roll flag is reset in step S12 and the control is ended. On the other hand, when it is not determined that the holding timer has expired in the step S11, the control is directly ended and the controller 34 repeats other steps such as the main routine until the holding timer expires.

Though the holding time is changed stepwise according to the vehicle speed in the modification described above, the holding time may be continuously changed according to the vehicle speed.

Though, in the embodiment and the modification described above, rolling of the vehicle is detected through the steering angle and the vehicle speed, it may be detected by way of the angular velocity of the steering wheel or the acceleration of the angular velocity of the steering wheel.

Further, the present invention can be applied to suspension systems of types other than the air spring type.

I claim:

1. A vehicle suspension system comprising a front suspension system for resiliently suspending the front wheels of a vehicle, a rear suspension system for resiliently suspending the rear wheels of the vehicle, at least one of the front and rear suspension systems having a variable suspension characteristic, an adjustment means for changing the suspension characteristic of said at least one of the front and rear suspension systems, a roll detecting means which detects rolling of the vehicle exceeding a predetermined level and outputs a detection signal, a vehicle speed detecting means which detects whether the vehicle speed is higher than a predetermined value and outputs a detection signal, and a control means which receives the detection signals from the roll detecting means and the vehicle speed detecting means and delivers to the adjustment means a control signal to control the suspension characteristic of said at least one of the front and rear suspension systems so that, when the vehicle speed is lower than the predetermined value, the steering characteristic is more toward the oversteer side when the degree of rolling of the vehicle is larger than the predetermined level than when the degree of rolling is smaller than the predetermined level and, when the vehicle speed is not lower than the predetermined value, the steering characteristic is fixed irrespective of the degree of rolling of the vehicle.

2. A vehicle suspension system as defined in claim 1 in which the suspension characteristic of each of the front and rear suspension systems is related to the resistance of vertical movement of the vehicle body relative to the wheels suspended by the suspension system, said adjustment means being adapted to control the resistance of vertical movement, and said control means delivers to the adjustment means a control signal which controls the resistance of vertical movement of said at least one of the front and rear suspension systems so that, when the vehicle speed is lower than the predetermined value, the ratio of the resistance of vertical movement of the front suspension system to that of the rear suspension system is smaller when the degree of rolling of the vehicle is larger than the predetermined level than when the degree of rolling is smaller than the predetermined level and, when the vehicle speed is not lower than the predetermined value, the ratio is fixed irrespective of the degree of rolling of the vehicle.

3. A vehicle suspension system as defined in claim 2 in which the suspension characteristic of each of said front and rear suspension systems can be changed between a hard mode in which the resistance of vertical movement is large and a soft mode in which the resistance of vertical movement is small, and the suspension characteristic of the front suspension system is kept in the hard mode irrespective of the vehicle speed and the degree of rolling of the vehicle, and the suspension characteristic of the rear suspension system is set to the hard mode when the vehicle speed is lower than the predetermined value and the degree of rolling is larger than the predetermined level and otherwise set to the soft mode.

4. A vehicle suspension system as defined in claim 3 in which when the vehicle speed is not higher than a second predetermined value lower than said predetermined value, the suspension characteristics of both the front and rear suspension systems are set to the soft mode when the degree of rolling is smaller than the predetermined level and are set to the hard mode when the degree of rolling is larger than the predetermined level.

5. A vehicle suspension system as defined in claim 4 in which said control means further comprises a holding means for keeping the suspension characteristic of the rear suspension system in the hard mode for a predetermined time interval after the degree of rolling is reduced below the predetermined level.

6. A vehicle suspension system as defined in claim 5 in which said predetermined time interval is shortened as the vehicle speed increases.

7. A vehicle suspension system as defined in claim 2 in which each of said front and rear suspension systems comprises a pair of suspension assemblies for respectively suspending the right and left wheels, and each of the suspension assemblies comprises a shock absorber the damping rate of which is variable, said adjustment means being adapted to control the damping rate of the shock absorbers, the resistance of vertical movement being increased by increasing the damping rate.

8. A vehicle suspension system as defined in claim 7 in which said adjustment means comprises a control means for controlling flow of fluid between a pair of fluid chambers defined in said shock absorbers, and an electric actuator for driving the control means.

9. A vehicle suspension system as defined in claim 2 in which each of said front and rear suspension systems comprises a pair of suspension assemblies for respectively suspending the right and left wheels, and each of the suspension assemblies is of an air spring type, said adjustment means being adapted to control the spring rate of the air spring by controlling the volume of the air chamber of the air spring, the resistance of vertical movement being increased by increasing the spring rate.

10. A vehicle suspension system as defined in claim 9 in which said air spring type suspension assembly includes an accumulator connected to the air chamber and said adjustment means comprises a solenoid valve which makes and breaks communication between the accumulator and the air chamber, the resistance of vertical movement being increased when the accumulator and the air chamber are out of communication with each other.

11. A vehicle suspension system as defined in claim 2 in which said roll detecting means includes a steering angle detecting system and determines said predetermined level of the degree of rolling according to the vehicle speed and the steering angle.

12. A vehicle suspension system comprising a pair of front suspension assemblies for resiliently suspending the front wheels of a vehicle, a pair of rear suspension assemblies for resiliently suspending the rear wheels of the vehicle, each of the suspension assemblies comprising a shock absorber the damping rate of which is variable, an adjustment means for changing the damping rate of the shock absorber of each suspension assembly, a roll detecting means which detects rolling of the vehicle exceeding a predetermined level and outputs a detection signal, a vehicle speed detecting means which detects whether the vehicle speed is higher than a predetermined value and outputs a detection signal, and a control means which receives the detection signals from the roll detecting means and the vehicle speed detecting means and delivers to the adjustment means a control signal which controls the damping rates of the shock absorber of the front and rear suspension assemblies so that, when the vehicle speed is lower than the predetermined value, the ratio of the damping rate of the shock absorbers of the front suspension assemblies to that of the rear suspension assemblies is smaller when the degree of rolling of the vehicle is larger than the predetermined level than when the degree of rolling is smaller than the predetermined level and, when the vehicle speed is not lower than the predetermined value, the ratio is fixed irrespective of the degree of rolling of the vehicle.

13. A vehicle suspension system comprising a pair of front suspension assemblies for resiliently suspending the front wheels of a vehicle, a pair of rear suspension assemblies for resiliently suspending the rear wheels of the vehicle, each of the suspension assemblies comprising a spring the spring rate of which is variable, an adjustment means for changing the spring rate of the spring of each suspension assembly, a roll detecting means which detects rolling of the vehicle exceeding a predetermined level and outputs a detection signal, a vehicle speed detecting means which detects whether the vehicle speed is higher than a predetermined value and outputs a detection signal, and a control means which receives the detection signals from the roll detecting means and the vehicle speed detecting means and delivers to the adjustment means a control signal which controls the spring rate of the spring of the front and rear suspension assemblies so that, when the vehicle speed is lower than the predetermined value, the ratio of the spring rate of the springs of the front suspension assemblies to that of the rear suspension assemblies is smaller when the degree of rolling of the vehicle is larger than the predetermined level than when the degree of rolling is smaller than the predetermined level and, when the vehicle speed is not lower than the predetermined value, the ratio is fixed irrespective of the degree of rolling of the vehicle.

* * * * *